United States Patent
Strünkmann et al.

(10) Patent No.: US 10,885,195 B2
(45) Date of Patent: Jan. 5, 2021

(54) PROCESS FOR LOADING A SECURE MEMORY IMAGE FOR A MICROCONTROLLER AND ASSEMBLY INCLUDING A MICROCONTROLLER

(71) Applicant: Weidmüller Interface GmbH & Co. KG, Detmold (DE)

(72) Inventors: Marc Strünkmann, Paderborn (DE); Ingo Gurlt, Bielefeld (DE); Andreas Böckstiegel, Oerlinghausen (DE)

(73) Assignee: Weidmüller Interface GmbH & Co. KG

( * ) Notice: Subject to any disclaimer, the term of this patent is extended or adjusted under 35 U.S.C. 154(b) by 141 days.

(21) Appl. No.: 15/770,619

(22) PCT Filed: Nov. 16, 2016

(86) PCT No.: PCT/EP2016/077830
§ 371 (c)(1),
(2) Date: Apr. 24, 2018

(87) PCT Pub. No.: WO2017/085108
PCT Pub. Date: May 26, 2017

(65) Prior Publication Data
US 2018/0314830 A1 Nov. 1, 2018

(30) Foreign Application Priority Data
Nov. 16, 2015 (DE) .......................... 10 2015 119 802

(51) Int. Cl.
*G06F 21/57* (2013.01)
*G06F 9/4401* (2018.01)
(Continued)

(52) U.S. Cl.
CPC ............ *G06F 21/575* (2013.01); *G06F 9/441* (2013.01); *G06F 21/51* (2013.01); *G06F 21/76* (2013.01)

(58) Field of Classification Search
None
See application file for complete search history.

(56) References Cited

U.S. PATENT DOCUMENTS

| 5,893,923 A | 4/1999 | Bush et al. |
| 7,765,393 B1 * | 7/2010 | Lee ........................ G06F 9/4401 713/2 |

(Continued)

FOREIGN PATENT DOCUMENTS

WO 2015168211 A1 11/2015

OTHER PUBLICATIONS

Self Detection and Correction Method for Handling Multiple Boot Images; Publication Date: Sep. 9, 2010. Publication Venue: IP.com PAD (Year: 2010).*

(Continued)

*Primary Examiner* — Madhuri R Herzog
(74) *Attorney, Agent, or Firm* — Laubscher & Laubscher, P.C.

(57) ABSTRACT

A process for loading a secure memory image for a startup procedure of a microcontroller from an external non-volatile memory has the microcontroller configured to assume a locked state in which execution of any program is prevented pending a restart of the microcontroller when a data section of a secure memory image is faulty. The process includes the following steps: detection of the locked state of the microcontroller by a controller located outside of the microcontroller, institution of precautionary measures that lead to modified read data values of the memory image in a subsequent attempt by the microcontroller to read the memory (Continued)

image; and initiation of a restart of the microcontroller to cancel the locked state, and thus initiation of a renewed attempt to load the memory image. An assembly including a microcontroller, an external non-volatile memory and a controller implements such a process.

11 Claims, 4 Drawing Sheets

(51) Int. Cl.
*G06F 21/51* (2013.01)
*G06F 21/76* (2013.01)

(56) References Cited

U.S. PATENT DOCUMENTS

| | | | | |
|---|---|---|---|---|
| 7,996,711 | B2* | 8/2011 | Edwards | G06F 11/1068 714/6.11 |
| 9,165,143 | B1 | 10/2015 | Sanders et al. | |
| 9,230,112 | B1* | 1/2016 | Peterson | G06F 21/575 |
| 2003/0066062 | A1* | 4/2003 | Brannock | G06F 8/654 717/169 |
| 2005/0138409 | A1 | 6/2005 | Sheriff et al. | |
| 2007/0226704 | A1 | 9/2007 | Nichols | |
| 2008/0010538 | A1 | 1/2008 | Satish et al. | |
| 2013/0013906 | A1 | 1/2013 | Brown et al. | |
| 2013/0268746 | A1* | 10/2013 | Hsu | G06F 21/572 713/2 |
| 2014/0281452 | A1* | 9/2014 | Friedman | G06F 11/1417 713/2 |
| 2014/0281460 | A1 | 9/2014 | Friedman et al. | |
| 2014/0379637 | A1 | 12/2014 | Seinfeld et al. | |

OTHER PUBLICATIONS

Crago, Simon. "Processor Recovery from Corrupted Boot Code." Motorola Technical Developments 37 (1999): 186-190. (Year: 1999).*

* cited by examiner

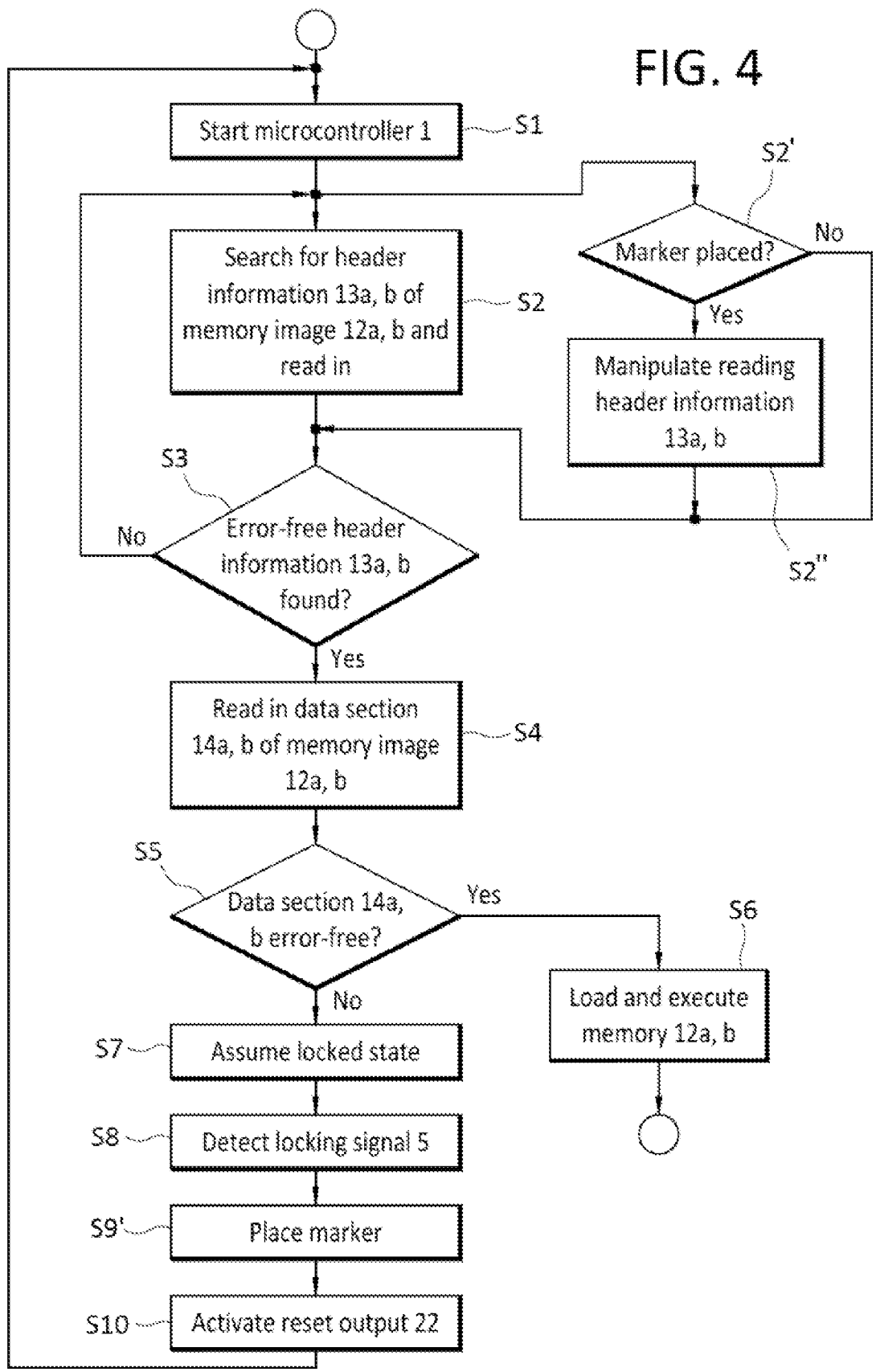

PROCESS FOR LOADING A SECURE MEMORY IMAGE FOR A MICROCONTROLLER AND ASSEMBLY INCLUDING A MICROCONTROLLER

This application is a § 371 of PCT/EP2016/077830 filed Nov. 16, 2016. PCT/EP2016/071926 claims priority of DE 10 2015 119 902.9 filed Nov. 16, 2015. The entire contents of these applications are incorporated herein by reference.

BACKGROUND OF THE DISCLOSURE

The disclosure relates to a process for loading a secure memory image for the startup procedure of a microcontroller from an external non-volatile memory. The disclosure further relates to an assembly suitable for carrying out the process and including a microcontroller.

After a microcontroller is started, for example once it has been powered up, a program stored in a non-volatile memory is typically loaded into the working memory of the microcontroller and executed. This first program that is loaded is also referred to as a boot loader, as it may also be used to subsequently load additional programs with startup routines. This program is typically stored in the non-volatile memory in the form of a memory image. This memory image is also referred to as a boot image.

Particularly in the case of more powerful microcontrollers, external non-volatile memories are often provided, from which the memory image for the first startup procedure can be loaded. In such cases, if necessary, an additional startup program is executed in an internal non-volatile memory, usually a ROM (read only memory), with the task of the program being to load the actual memory image for the startup procedure from the external non-volatile memory. The present application relates not to the execution of such an internal startup program, but to the loading of the actual memory image for the startup procedure from the external non-volatile memory.

In the context of the present application, a "microcontroller" is understood both as an independent microcontroller and as a microcontroller which is part of a semiconductor module that has additional components. Such semiconductor modules are also referred to as "system on chip" modules. For example, programmable logic modules (FPGA—Field Programmable Gate Array) are frequently combined with a microcontroller to form a semiconductor module. One example of such a combination of an FPGA and a microcontroller are the "ZYNQ" series semiconductor modules from XILINX, Inc. In these systems, the microcontroller is typically started first by loading a memory image, after which it takes over configuration and setup of the FPGA.

With the aforementioned microcontrollers, to enable the microcontroller to be started up securely even in the case of a faulty memory image, at least one second memory image for the startup process is frequently stored in addition to the first memory image, and is loaded as an alternative if the first memory image is determined to be faulty.

In addition, in particular to prevent tampering with an externally stored memory image, it is frequently possible for a secure memory image to be loaded for the startup procedure. This type of secure memory image is stored encrypted and, if necessary, signed in the external non-volatile memory, and once it has been loaded, it is decrypted before being executed. Encryption, combined with authentication methods, ensures the integrity of the memory image.

Typically, a memory image includes header information (header) and the actual image data (data section). A memory image is identified based on the header or on specific information in the header. For the header to be recognized, even in an encrypted memory image, only the data section is encrypted and not the header itself. To prevent tampering with the header, however, the header may be signed, i.e. provided with authentication information, which in turn utilizes encryption technology. Alternatively or additionally, the header may be provided with a checksum.

If a faulty header is detected during loading of a secure memory image, the next step may be to load the next memory image, assuming another secure memory image is available. An error may be the result of tampering, but may also be caused by a physical defect of the storage medium, or by an improperly completed software update, i.e. "firmware update".

If, in contrast, an error-free header of a memory image is detected but an associated data section is determined to be faulty, the startup procedure for the microcontroller will be terminated and the microcontroller will be placed in a secure locked state (security lockdown), in which execution of any program is prevented and which can be released only by a restart, initiated by interrupting the supply of power to the microcontroller.

The security mechanism described, which engages when the data section of a secure memory image is determined to be faulty, is appropriate for high-security applications, for example in ATMs, where reliable prevention of tampering is critical. In other systems, such as industrial automation systems, although security must be tight enough to prevent a faulty memory image from being executed, placement of the system in a locked state is frequently undesirable, since attempts at tampering can generally be ruled out, and a high level of accessibility of the system takes priority over the prevention of tampering attempts. In such cases, the option of loading an additional memory image if errors are detected in the data section of the first memory image that is loaded would therefore be desirable.

SUMMARY OF THE DISCLOSURE

In accordance with the method, once the microcontroller has been started, at least header information of a first secure memory image is read by the microcontroller and analyzed to determine whether the header information is faulty. If the header information is error-free, the data section of the memory image is read by the microcontroller and analyzed to determine whether the data section is faulty. If the data section is error-free, the memory image is executed by the microcontroller. If the data section is faulty, the system will be placed in a locked state, in which execution of any program is prevented pending a restart of the microcontroller.

According to the disclosure, the locked state of the microcontroller is then detected by a controller located outside of the microcontroller. Following detection of the locked state, precautionary measures are instituted that result in modified read-in data values of the memory image during a subsequent attempt by the microcontroller to read the memory image. Finally, to cancel the locked state, the microcontroller is restarted, causing the first steps of this process to be repeated.

According to the disclosure, a renewed attempt to start the microcontroller using modified data values for the first memory image loaded is thus brought about externally.

For example, the modified data values may reflect a subsequent memory image, which is correct in terms of header information and data section, and which is simply loaded during the next startup attempt and executed.

However, the modified data values may also cause the header information of the memory image that contained the faulty data section to also appear faulty, so that during the next startup attempt, a memory image that contains faulty header information is encountered first. The mechanism will then proceed to load the next memory image for the microcontroller, which the microcontroller will carry out in the event of unreadable or faulty header information.

In either case, a permanently locked state or a return to a locked state is prevented.

The process can be implemented without altering the behavior of the microcontroller with respect to an incorrect memory image.

Thus, the process can be implemented by a user of a corresponding microcontroller in the application thereof, in that, for example, a corresponding controller actuates the microcontroller or the external non-volatile memory appropriately.

In an advantageous embodiment of the process, the instituted precautionary measures include manipulating the external non-volatile memory such that a correct memory image is read out by the microcontroller in the memory area addressed during the next read attempt. This can be accomplished by writing an uncorrupted memory image, which is held in another memory, into the external non-volatile memory at the original memory location of the corrupt memory image. Alternatively, again by manipulating one or more address lines of the non-volatile external memory, the system can be switched to a different memory area where another memory image is available, which is then loaded during a subsequent read attempt. It is further possible for the configuration inputs of the microcontroller to be switched such that the microcontroller will automatically start a read attempt from an additional external non-volatile memory. In that case, the next memory image to be read is stored in the additional non-volatile external memory.

In a further advantageous embodiment of the process, the precautionary measures instituted include modifying the data values of the header information of the corrupt memory image in the external non-volatile memory. In an alternative embodiment, the precautionary measures include manipulating address and/or data inputs of the non-volatile external memory and/or of the microcontroller to modify data values that are read out from the external non-volatile memory temporarily and/or based on their address range in the external non-volatile memory.

As a result of the aforementioned precautionary measures, during the subsequent read attempt by the microcontroller, data values for the header information of the corrupt memory image can be read by the microcontroller such that they appear faulty when analyzed, or such that the memory image is not even encountered by the microcontroller. It is irrelevant whether the data values are also modified in the external non-volatile memory itself or remain unmodified in the memory but appear during the reading procedure to be manipulated due to a modification or masking of a data line and/or an address line.

In a further advantageous embodiment of the process, this process is repeated until an uncorrupted memory image is loaded or until no additional uncorrupted alternative memory image is available. In the latter case, it may be provided for an alert signal to be sent the controller or for an alert message to be forwarded via the controller to a higher-level monitoring system.

An assembly according to the disclosure includes a microcontroller, an external non-volatile memory and a controller which is configured for implementing one of the aforementioned processes. The advantages described in connection with the process are achieved as a result. More particularly, with the assembly, on the user side, even if the first secure memory image has a faulty data section, the startup procedure will not be terminated, and will instead proceed automatically using one or more alternate memory images, without modification of the microcontroller.

BRIEF DESCRIPTION OF THE FIGURES

The disclosure will be explained in greater detail below in the context of exemplary embodiments, with reference to the accompanying drawing, in which:

FIG. 4 a flow chart of a further embodiment of a process for loading a secure memory image.

DETAILED DESCRIPTION

Figure 1:
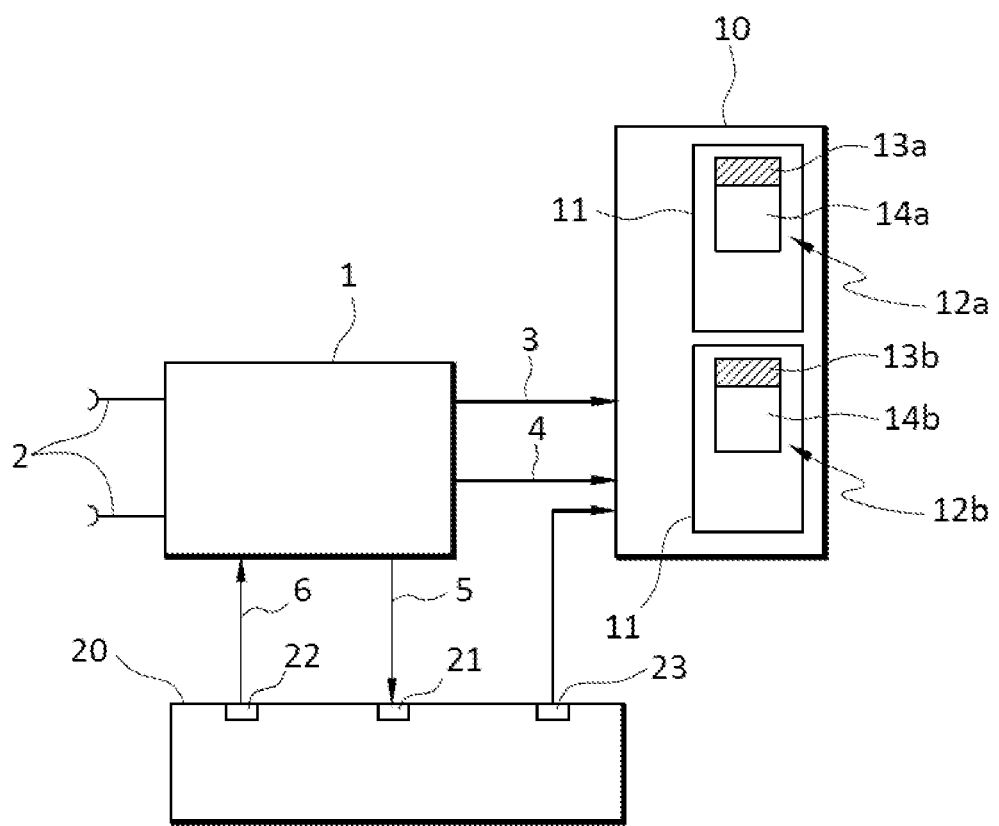
FIG. 1 a block diagram of an assembly including a microcontroller.

FIG. 1 shows a block diagram of an assembly including a microcontroller 1 having an external non-volatile memory 10 and a controller 20.

The microcontroller 1 shown may be a microcontroller for system control, i.e. an embedded system for example, which performs control functions for a system not shown here. Microcontroller 1 may be integrated with other logic circuits in a housing or may be installed on a semiconductor substrate (system on chip). The other logic component may be an FPGA, for example.

A supply voltage (GND/V+) is applied via power supply terminals 2 to microcontroller 1, supplying the microcontroller appropriately with operating current. The microcontroller also has terminals for an address bus 3 and a data bus 4, via which it is connected to the external non-volatile memory 10. Address bus 3 and data bus 4 are configured as parallel buses in the present exemplary embodiment. The external non-volatile memory 10 may be a FLASH memory, for example, or a SRAM (Static Random Access Memory) module that is permanently supplied with a maintenance voltage. Microcontroller 1 also has an output where a locking signal 5 is emitted.

Microcontroller 1 and non-volatile external memory 10 are both connected to a controller 20. Controller 20 comprises an input 21 for locking signal 5 from microcontroller 1. The controller also has an output 22 for a restart or reset signal 6 which is coupled to a restart or reset input of microcontroller 1. Via output 22, hereinafter also referred to as reset output 22, controller 20 can force a restart of microcontroller 1. Finally, an address output 23 is provided, which is connected to an address input of memory 10.

External non-volatile memory 10 has terminals for a number n of address lines, for example n=32 address lines. Of these address lines, n−1, or 31 in the example, form address bus 3, via which addresses are transmitted from microcontroller 1 to non-volatile external memory 10. The remaining terminal for an address line is connected to address output 23 of controller 20. This terminal is the most important address line for the non-volatile external memory 10.

Depending on the logic level ("0" or "1") on this address line, two different memory areas 11a, 11b of memory 10 can thus be selected, in each of which addressing actions of the (n−1) address lines, which are transmitted via address bus 3, are assigned to a memory cell. In the present example, memory cells having a width of 16 bits are provided, and are transmitted via data bus 4 to microcontroller 1. The arrangement shown enables controller 20 to switch between the two memory areas 11a and 11b once microcontroller 1 has accessed memory 10.

In the present case, a secure memory image 12a, 12b for a startup process of microcontroller 1 is stored in each of the memory areas 11a, 11b. Each of the memory images 12a, 12b comprises unencrypted header information 13a, 13b, along with an associated encrypted data section 14a, 14b.

An exemplary embodiment of a process according to the application for loading a secure memory image during the startup procedure of a microcontroller will be explained in greater detail below in reference to the flow chart of FIG. 2. The process can be implemented using the assembly shown in FIG. 1, for example, and will therefore be explained in greater detail by way of example with reference to the elements of FIG. 1 and the reference symbols used therein.

In a first step S1, microcontroller 1 is started (or restarted), for example by activating the reset input of microcontroller 1.

As a consequence of the restart of microcontroller 1, the microcontroller undertakes predefined steps to load a first memory image 11a, stored in the external nonvolatile memory 10. If multiple external memories 10 are provided, a selection may be made in advance, by use of terminals not shown in FIG. 1, as to which of the connected non-volatile external memories should be used. In the present case it is assumed, by way of example, that only one non-volatile external memory 10 is provided, in which the first memory image 11a is expected and searched for by microcontroller 1.

In the next step S2, at least the header information 13a of the first memory image 11a is read in by microcontroller 1. In the next step S3, the header information 13a is analyzed to determine whether this header information 13a identifies a valid memory image 12a. This may involve evaluating a checksum or a signature, for example. Alternatively, upon detection of a specific data value sequence that identifies the header information, the presence of a memory image 12a can be assumed.

If the header information 13a is determined to be faulty, memory area 11a is searched for the next memory image.

If it is determined in step S3 that the header information 13a is error-free and identifies a memory image, then in the next step S4, the associated data section 14a of the memory image 12a is read in and decrypted. In the following step S5 a check is made to determine whether the data section 14 is correct, i.e. not tampered with. This can be determined as part of the decryption process, e.g. using co-encrypted checksums.

If the data section 14 is recognized as error-free in step S5, the process jumps to step S6, in which the memory image 12a is actually transmitted to the working memory of microcontroller 1 (unless it was transmitted previously in connection with steps S4 and S5), where it is executed. The further control via microcontroller 1 thus accepts the secure memory image 12a, and the process is ended.

If, however, the data section is determined to be faulty in step S5, the process moves on to the next step S7, in which the startup procedure of microcontroller 1 is terminated and microcontroller 1 is placed in a locked state, i.e. a secured lockdown. In the locked state, program execution is not possible. At the same time, microcontroller 1 emits locking signal 5 at its corresponding output, and the locking signal is read in at input 21 by controller 20. The locked state can be released only by restarting the microcontroller 1.

Steps S1 to S7 described thus far are carried out by microcontroller 1 in the standard manner. In the steps described below, controller 20 modifies the startup procedure for microcontroller 1 according to the application, for which no intervention into microcontroller 1 itself is required.

In the next step S8, the presence of locking signal 5 at input 21 is detected by controller 20. For this purpose, controller 20 monitors input 21 perpetually, enabling it to respond in the event that microcontroller 1 switches to the locked state in step S7 or in any of the subsequent steps.

When a switch to the locked state is detected, the process continues to step S9, in which address output 23 of controller 20 is moved from the "logic 0" level to the "logic 1" level. The switching of address output 23 causes the non-volatile external memory 10 to switch to the second memory area 11b for all subsequent memory addressing actions by microcontroller 1.

In the next step S10, reset output 22 of controller 20 is activated briefly, thereby activating the restart or reset input. This causes microcontroller 1 to restart and to begin again with step S1 of the process.

In the repeat run-through of step S2 of the process, when microcontroller 1 attempts to load the first memory image it will access the second memory image 12b in the second memory area 11b, which is then loaded and analyzed in the subsequent steps S3 to S5 of the process. In this repeat of step S2, the accessing of memory image 12b is due to the intervention by controller 20 into the external non-volatile memory 10 via address output 23.

Assuming that in this case memory image 12b is correct with regard to both the header information 13b and the data section 14b, memory image 12b is fully decrypted by microcontroller 1 and loaded into the working memory, by which it is executed in step S6.

Figure 3:
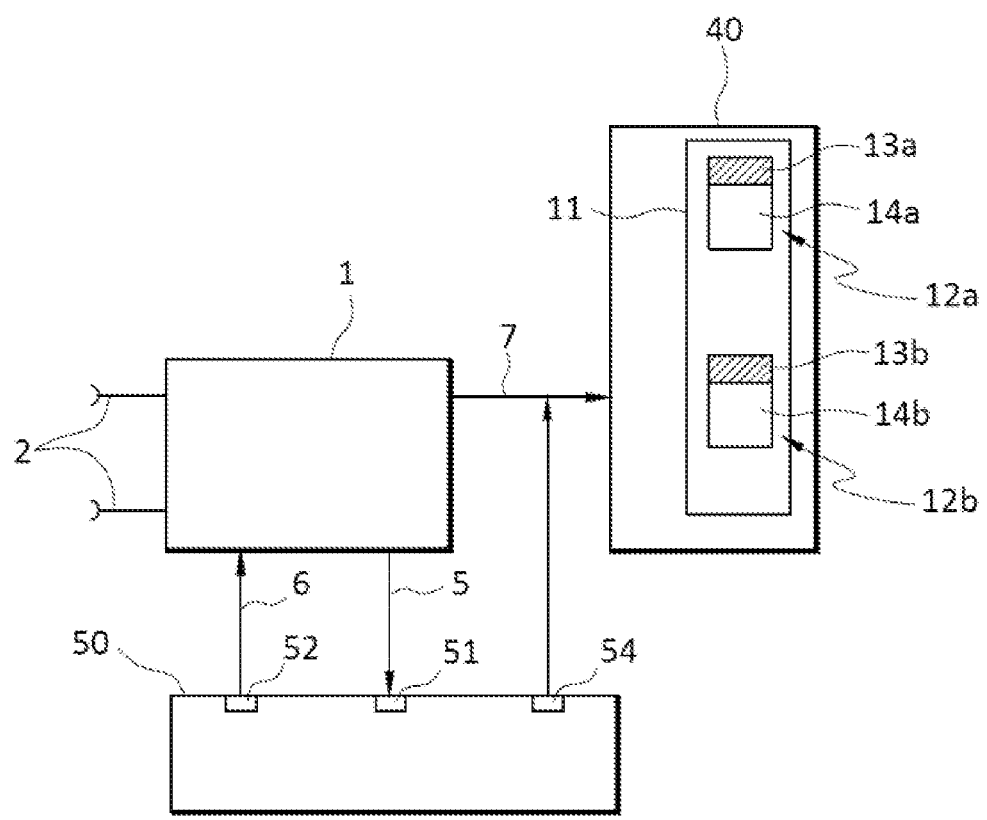
FIG. 3 a block diagram of a further assembly including a microcontroller.

FIG. 3 shows a further exemplary embodiment of an assembly including a microcontroller 1 and an external memory 40 along with a controller 50, in a block diagram similar to that of FIG. 1. With regard to the basic arrangement and features of the components, reference is made to the exemplary embodiment of FIG. 1. Differences from the exemplary embodiment will be described below.

The exemplary embodiment of FIG. 3 differs from the exemplary embodiment of FIG. 1 in that the external non-volatile memory 40 is coupled to microcontroller 1 not via parallel address bus 3 and data bus 4, but via a serial bus 7, which transmits both address information and data information. Serial bus 7 has four lines, for example, two of which serve to supply power to external memory 40, and two of which are data lines with differential signal transmission.

In the present case, memory 40 contains only one memory area 11, in which two memory images 12a, 12b for the startup procedure of microcontroller 1 are stored in succession. Once again, each of the memory images 12a, 12b contains header information 13a, 13b and an associated data section 14a, 14b. It should be noted that more than the two memory images shown may also be stored in succession in memory area 11.

In keeping with the exemplary embodiment of FIG. 1, controller 50, embodied as external to microcontroller 1 and to external memory 10, once again has an input 51 for reading out locking signal 5 from microcontroller 1 and a reset output 52 for a reset signal 6, which is fed to microcontroller 1.

In place of address output 23, which in the exemplary embodiment of FIG. 1 was used to switch between memory areas, in the exemplary embodiment of FIG. 3 a data connection 54 is provided, which contacts the data lines of serial bus 7. Via the data connection 54, the data traffic on serial bus 7 can be read in and thus monitored, and the data lines and thus the data traffic on serial bus 7 can be manipulated.

Figure 2:
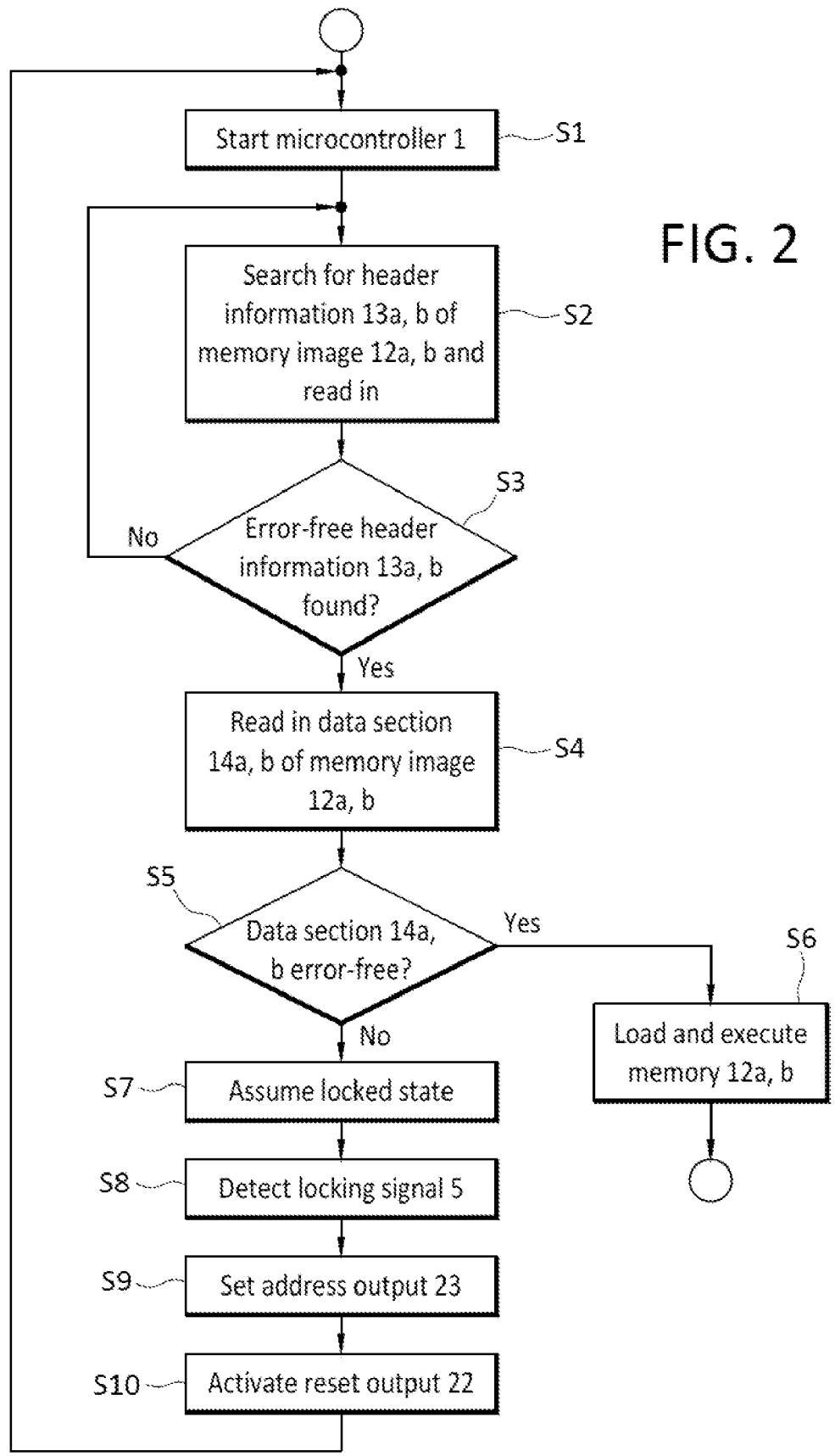
FIG. 2 a flow chart of a process for loading a secure memory image.

FIG. 4 shows, similar to FIG. 2, an embodiment of a process for loading a secure memory image that is suitable for execution by the assembly according to FIG. 3. The process is illustrated in FIG. 4 in a flow chart comparable to that of FIG. 2. Steps that proceed identically in the two exemplary embodiments are identified identically in the two figures. Steps that are different or that have been added in the embodiment of FIG. 4 as compared with that of FIG. 2 are identified by single or double inverted commas. With respect to the steps known from FIG. 2, explicit reference is herewith made to the description of FIG. 2.

Once again, the process begins with step S1, in which microcontroller 1 is started.

In the subsequent step S2, microcontroller 1 searches memory area 11, starting at the beginning of memory area 11, for header information 13a, 13b that identifies a memory image 12a, 12b. If such header information 13a, 13b is found, at least the header information 13a, 13b in alternative embodiments is read onto the entire memory image 12a, 12b.

In a subsequent step S3, a check is made to determine whether the read-in header information 13a, 13b is error-free; if not, the process jumps back to step S2, in which memory area 11 is further searched for the presence of additional header information, for example header information 13b.

In parallel with step S2, steps S2' and optionally S2" are executed by controller 20. In step S2', controller 20 checks to determine whether a marker (flag) has been placed. This marker indicates whether microcontroller 1 has been placed in a locked state in a previously executed startup attempt. If not, the subsequent step S2" is skipped.

In a first run through the process shown here, this marker is not placed. Step S2" is therefore not performed.

In step S4, similarly to the process of FIG. 2, the data section 14a, 14b associated with the memory image 12a, 12b is loaded, and in step S5 is checked. If the data section is correct, the corresponding memory image 12a, 12b will be transmitted to the internal working memory of microcontroller 1 in step S6 and executed.

If the data section 14a, 14b is incorrect, in step S7 microcontroller 1 will enter the locked state, which is detected in step S8 by controller 20 on the basis of locking signal 5.

In step S9', which in this exemplary embodiment is executed in place of step S9 of the exemplary embodiment of FIG. 2, the marker mentioned in connection with step S2' is placed to indicate during the subsequent startup procedure of microcontroller 1 that the previous startup procedure ended in the locked state. Again similarly to the process of FIG. 2, in the subsequent step S10, reset output 22 is activated to restart microcontroller 1 and thus to start the process over again with step S1.

In the subsequent step S2 of the renewed process, microcontroller 1, which itself has no information regarding the previous locked state, again searches through memory area 11 for header information 13a, 13b of a memory image 12a, 12b.

In the steps carried out in parallel by controller 20, it is recognized in step S2' that the marker indicating the previously locked state has been placed, and step S2" is executed. In this step S2", access by microcontroller 1 to the external non-volatile memory 10 is monitored via data connection 24. Based on this monitoring, controller 20 determines that microcontroller 1 is querying the first header information 13a in memory area 11 from memory 10. While memory 10 outputs header information 13a to microcontroller 1, memory device 20 manipulates signals on serial bus 7 via data connection 24, which is now used as an output. As a consequence, in step S3, header information 13a is not recognized as correct header information, whereupon in step S2, the process searches for additional header information located in memory area 11 and accordingly retrieves header information 13b.

Access to the header information 13b is not manipulated by controller 20. Accordingly, this header information 13b is recognized as error-free and in step S4, the corresponding data section 14b is reloaded. Assuming that the data section is now correct, the process jumps from step S5 to step S6, where memory image 12b is then loaded and executed.

It may optionally be provided that, if the second memory image 12b is faulty, the process will be repeated, in which case during the repeat of step S2', the reading in of both header information sets 13a, 13b would be manipulated to load an optionally provided third memory image. In that case, it would be necessary to provide multiple markers, rather than a single marker, to represent the behavior of microcontroller 1 (whether it was placed in a locked state or not) for each memory image 12a, 12b, or for at least a certain number of memory images.

In the process shown in FIG. 4, the data streams are thus manipulated when the external memory 10 is read, so that a memory image that would otherwise cause the system to be placed in a locked state is not recognized by the microcontroller 1, causing the microcontroller to search for and find another iteration of the memory image, in accordance with its internal search routine.

As an alternative to the process described above, other methods may be used in which a corrupt memory image is not even located by microcontroller 1, for example a manipulation of address values during accessing of the memory.

The invention claimed is:

1. A process for loading a secure memory image for a startup procedure of a microcontroller from an external non-volatile memory, comprising the steps of
   (a) starting the microcontroller and reading by the microcontroller at least header information of a secure memory image;
   (b) analyzing the header information to determine whether it is faulty;
   (c) if the header information is error-free, reading by the microcontroller a data section of the memory image and analyzing the data section to determine whether it is faulty;
   (d) if the data section is error-free, executing the memory image by the microcontroller;
   (e) if the data section is faulty, placing the microcontroller in a locked state in which execution of any program is prevented pending a restart of the microcontroller;

(f) detecting the locked state of the microcontroller by a controller located outside of the microcontroller;

(g) instituting precautionary measures that lead to modified read-in data values of the memory image in a subsequent attempt by the microcontroller to read the memory image, said precautionary measures including modifying the read-in data values of the header information of a faulty memory image in the external non-volatile memory in such a way that the read-in header information appears to be faulty; and (h) initiating a restart of the microcontroller to cancel the locked state and to repeat at least steps (a) through (e).

2. The process according to claim 1, wherein the precautionary measures include manipulating the external non-volatile memory such that during a renewed attempt by the microcontroller to read an addressed memory area, a correct memory image will be read out by the microcontroller.

3. The process according to claim 2, wherein an incorrect memory is overwritten in the external nonvolatile memory by another of the memory images.

4. The process according to claim 2, wherein address inputs of the external non-volatile memory are connected in such a way that during the renewed read attempt by the microcontroller, an address access by the microcontroller will be redirected to another memory area and thus to another of the memory images.

5. The process according to claim 2, wherein configuration inputs of the microcontroller are switched such that during the renewed read attempt, the microcontroller will read in another of the memory images from another external non-volatile memory.

6. The process according to claim 1, wherein the data values of the header information of the faulty memory image are modified in the non-volatile external memory.

7. The process according to claim 1, wherein address and/or data inputs of the non-volatile external memory are connected in such a way that at least one data value of the header information that has been modified by the microcontroller is read out from the external non-volatile memory.

8. The process according to claim 7, wherein the address and/or data inputs of the non-volatile external memory are temporarily connected and/or dependent upon the address range.

9. The process according to claim 1, and further comprising the step of repeating any of the steps of claims 1-8 until either an error-free memory image is loaded or all existing memory images have been read in and analyzed.

10. The process according to claim 9, wherein an alert signal or an alert message is output when no error-free memory image is found.

11. An arrangement comprising a microcontroller, an external non-volatile memory and a controller, configured to implement a process according to any of claims 1 to 5 and 6 to 10.

* * * * *